(12) United States Patent
Yumiba et al.

(10) Patent No.: US 6,654,380 B1
(45) Date of Patent: Nov. 25, 2003

(54) DATA EXCHANGE UNIT

(75) Inventors: Takashi Yumiba, Kyoto (JP);
Yoshihiro Tabira, Osaka (JP);
Hirotaka Itoh, Osaka (JP); Isamu Ishimura, Kyoto (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/497,194

(22) Filed: Feb. 3, 2000

(30) Foreign Application Priority Data

Feb. 4, 1999 (JP) .......................................... 11-027577

(51) Int. Cl.[7] ............................................ H04L 29/00
(52) U.S. Cl. ...................................... 370/412; 370/471
(58) Field of Search ................................ 370/412, 471, 370/280, 253; 710/30

(56) References Cited

U.S. PATENT DOCUMENTS

| | | | | |
|---|---|---|---|---|
| 5,546,377 A | * | 8/1996 | Ozveren | 370/253 |
| 5,632,016 A | * | 5/1997 | Hoch et al. | 710/30 |
| 5,970,055 A | * | 10/1999 | Park et al. | 370/280 |
| 6,310,884 B1 | * | 10/2001 | Odenwald, Jr. | 370/412 |

OTHER PUBLICATIONS

"Link (IEEE 1394) MD8413 Users Manual", FUJIFILM Microdevices Co., Ltd., 1996, pp. 73–83.

* cited by examiner

Primary Examiner—Salvatore Cangialosi
(74) Attorney, Agent, or Firm—Nixon Peabody, LLP

(57) ABSTRACT

Reception buffer, transmission buffer, transmission-reception buffer, reception filter and transmission filter are provided. The reception filter determines where a received packet should be stored based on the contents of the received packet. Specifically, in executing a READ command, a response packet, which is returned in response to a data transmission packet, is detected by the reception filter. Received packets of the other types are stored on the reception buffer. In executing a WRITE command, a data request packet is transmitted from the transmission buffer. A data reception packet responding to the data request packet is stored by the reception filter on the transmission-reception buffer. Received packets of the other types are stored on the reception buffer. The capacity of the transmission-reception buffer is twice as large as the size of a maximum transferable packet. Thus, overhead can be reduced and yet data can be transferred at higher speeds.

13 Claims, 12 Drawing Sheets

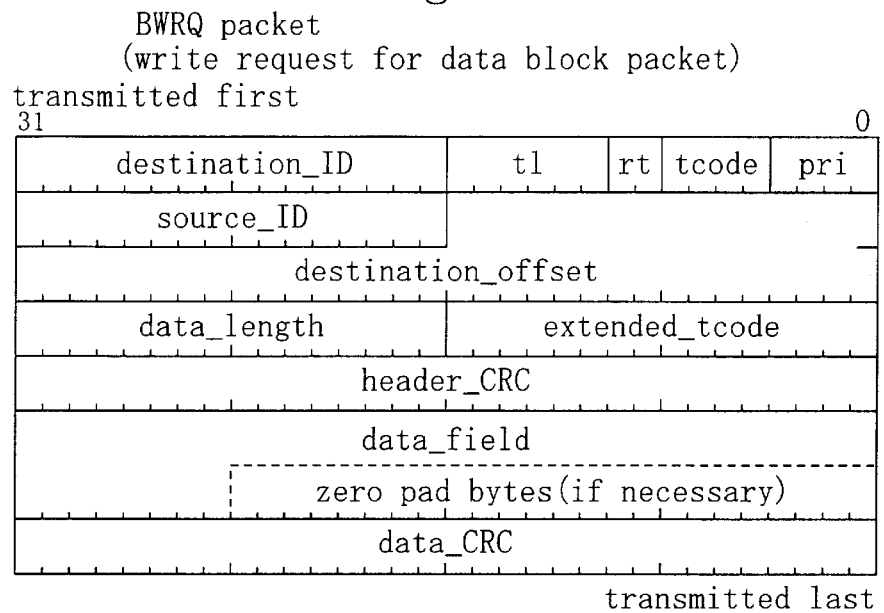
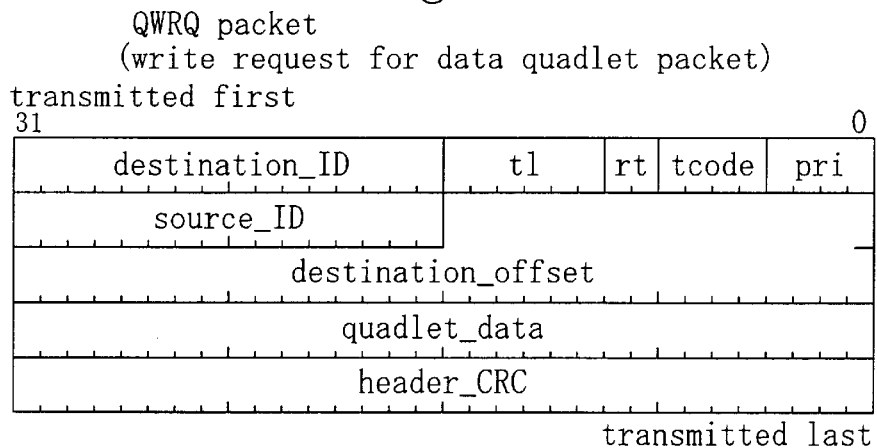
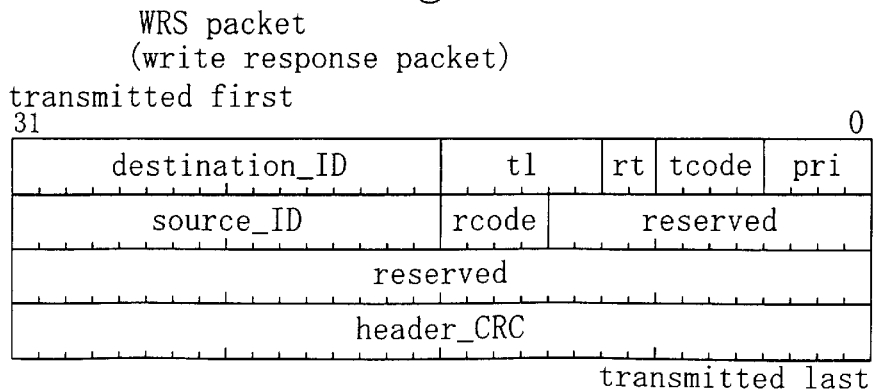

BRRQ packet (read request for data block packet)

BRRS packet (read response for data block packet)

internal BWRQ packet internal QWRQ packet internal WRS packet internal BRRQ packet internal BRRS packet

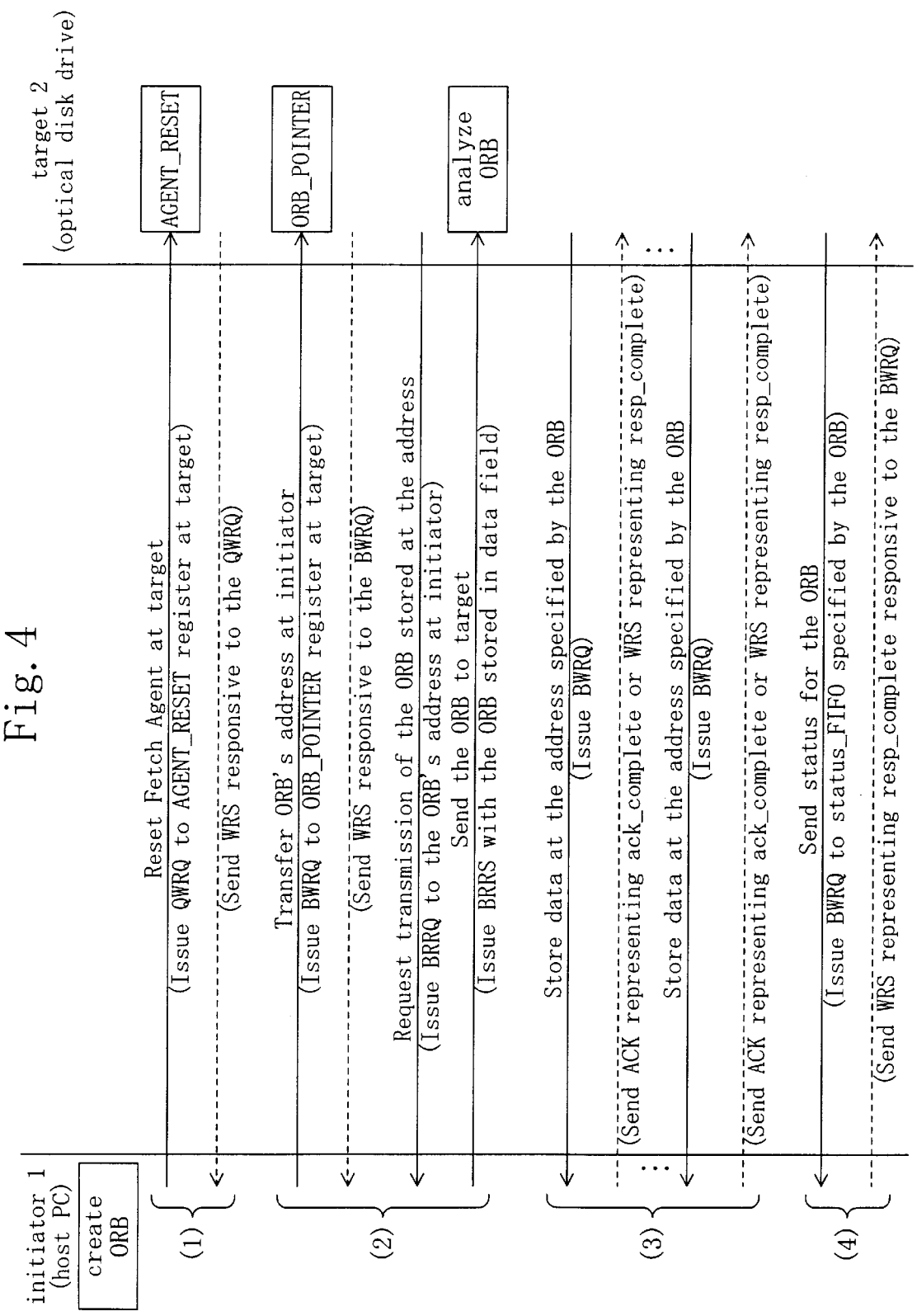

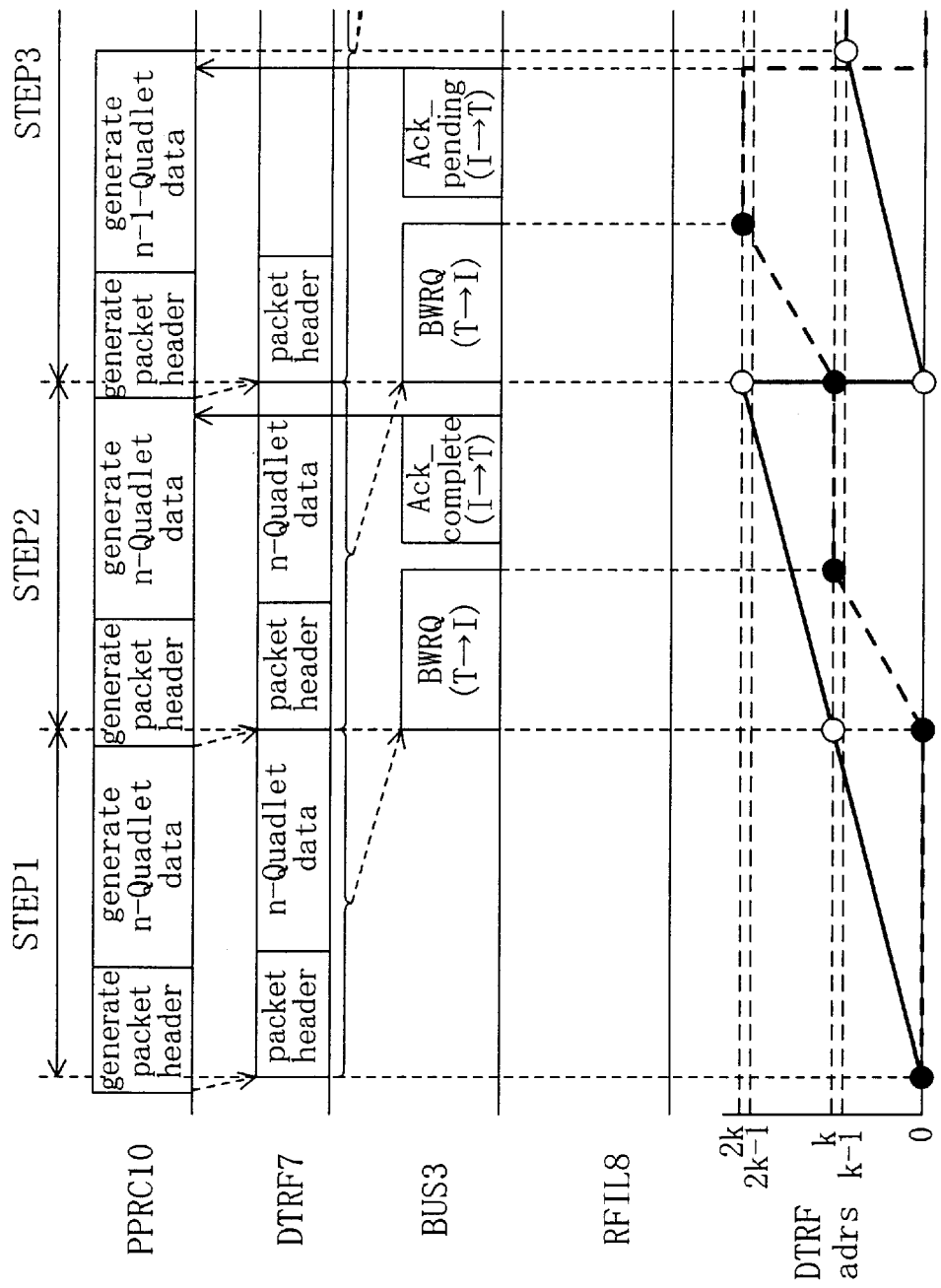

DATA EXCHANGE UNIT

BACKGROUND OF THE INVENTION

The present invention relates to a data exchange unit for transferring data, commands and so on in packets from a computer to a peripheral device such as optical disk drive, or vice versa, over a communication line.

In recent years, a telecommunications system complying with the IEEE 1394 standard has attracted much attention as a digital interface for interconnecting together audiovisual (AV) and computer components. The IEEE 1394 system is applicable to communicating not only between computer components, but also between AV components. This is because the IEEE 1394 standard defines both asynchronous and isochronous communications techniques alike. The asynchronous communications technique is applied to transferring computer data, for example, which does not always have to be transmitted in real time but must be highly accurate and reliable. On the other hand, the isochronous communications technique is applied to transferring AV data of a moving picture, for example, from which not so much reliability as real-time transmission is demanded more strongly. Thus, generally speaking, the asynchronous communications technique is preferred in writing computer data on an optical disk drive or reading computer data already recorded from the optical disk drive in accordance with the IEEE 1394 standard, for example. As for communications protocols defined for asynchronous communication between an initiator and a target, Serial Bus Protocol-2 (SBP-2) is under deliberation at the American National Standards Institute (ANSI). The SBP-2 standard defines various task management commands such as Login, QueryLogin and Abort-Task.

A conventional data exchange unit in accordance with the IEEE 1394 standard includes buffers exclusively used for transmission and reception (in this specification, these buffers will be called "transmission buffer" and "reception buffer", respectively). The size of each of these buffers is usually equal to the size of a maximum transferable packet. First-in-first-out buffers (FIFOs) implemented as these buffers are called "asynchronous transmission FIFO buffer (ATF)" and "asynchronous reception FIFO buffer (ARF)", respectively. Suppose an initiator has issued a request packet during the transfer of data in order to issue QueryLogin as a task management command. In such a situation, if every packet received is stored on the ARF on the target (or on the receiving end), then the type of the packet received must always be checked to perform appropriate processing thereon. More specifically, it is necessary to know whether the packet includes a task management command or whether the packet is a response packet including data responding to a request packet responsive to a READ command. Accordingly, a central processing unit (CPU) must always determine the type of the packet that has been stored on the ARF, thus adversely increasing the overhead and taking a long time to transfer required data.

In addition, the sizes of the ATF and ARF are both equal to the size of a maximum transferable packet. Therefore, when a READ command is executed, data of a next packet cannot be written onto the ATF until a data transfer transaction is finished considering a situation where a retry is requested. Thus, it takes an even longer time to transfer required data.

SUMMARY OF THE INVENTION

An object of the present invention is providing a data exchange unit, which can reduce the overhead needed in transferring data.

To achieve this object, an inventive data exchange unit is adapted to communicate with a counterpart unit through a transmission line using, as a unit, a packet including header and data fields. The data exchange unit includes transmission buffer, reception buffer, transmission-reception buffer, transmission filter, reception filter, packet processor and transceiver. The transmission filter selectively stores a packet to be transmitted on either the transmission buffer or the transmission-reception buffer depending on the contents of the packet to be transmitted. The reception filter selectively stores a received packet on either the reception buffer or the transmission-reception buffer depending on the contents of the received packet. The packet processor makes a packet containing information to be transmitted or fetches necessary information from the received packet. The transceiver converts the packet that has been stored on the transmission buffer or the transmission-reception buffer into an electrical signal to be transmitted through the transmission line or converts another electrical signal received through the transmission line into the packet that will be stored on the reception buffer or the transmission-reception buffer. The capacity of the transmission-reception buffer is preferably twice as large as the size of a maximum transferable packet.

BRIEF DESCRIPTION OF THE DRAWINGS

FIGS. 2A through 2E illustrate various formats of packets to be transferred on the IEEE 1394 bus shown in FIG. 1.

FIG. 4 illustrates an operation to be performed by the communications system shown in FIG. 1 when a READ command is executed.

FIGS. 5A and 5B illustrate the operation performed by the communications system shown in FIG. 1 when the READ command is executed.

DETAILED DESCRIPTION OF THE INVENTION

Hereinafter, an embodiment of the present invention will be described in detail with reference to the accompanying drawings. It will be apparent to those skilled in the art, however, that the present invention is in no way limited to the following particular embodiment but may assume many embodiments other than that specifically set out and described below.

Figure 1:
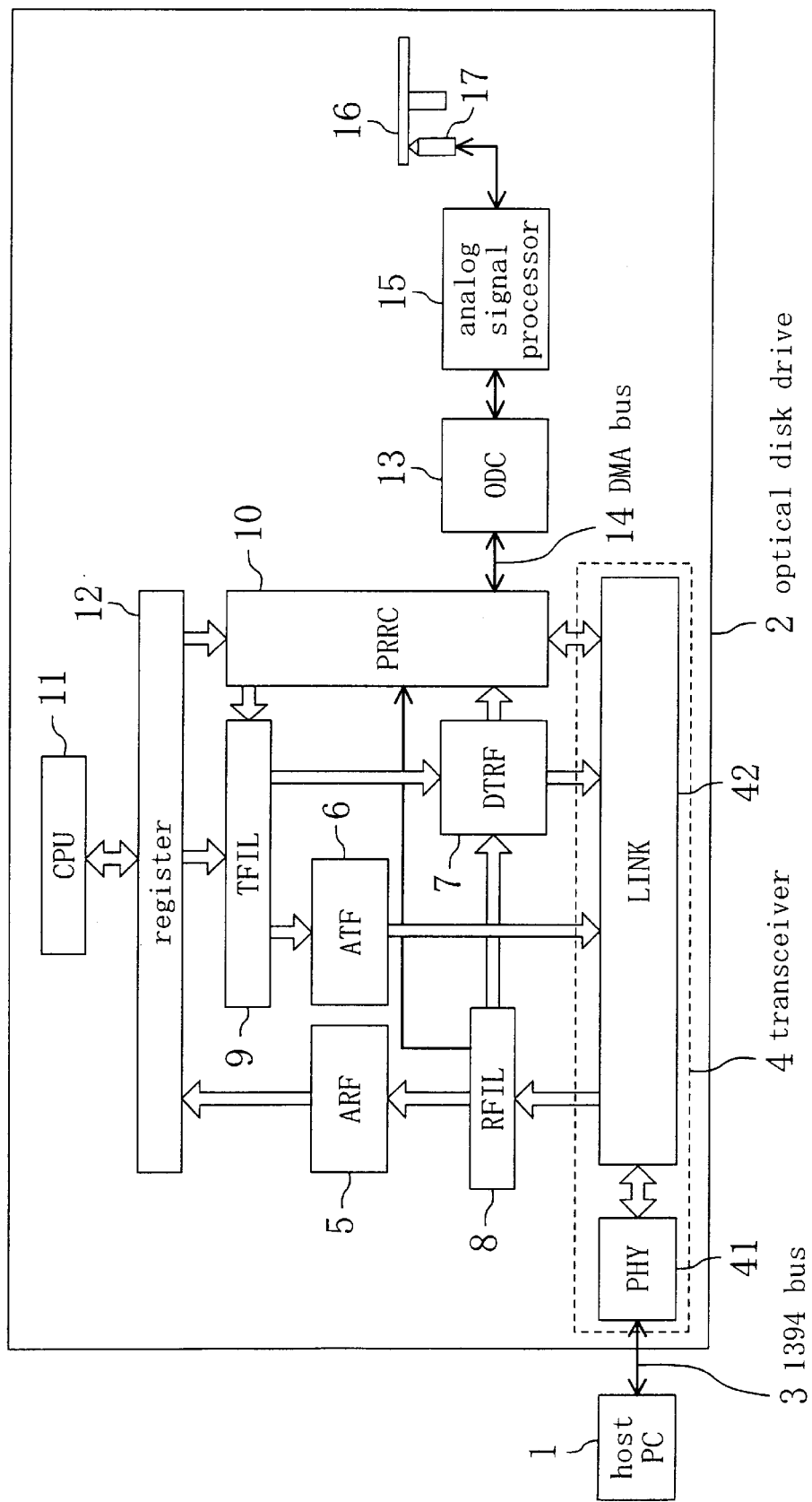
FIG. 1 is a block diagram illustrating an internal configuration of an optical disk drive including a data exchange unit according to the present invention.

FIG. 1 illustrates a configuration for a communications system including a data exchange unit according to an exemplary embodiment of the present invention. As shown in FIG. 1, the communications system includes a host personal computer (PC) 1, an optical disk drive 2 and an IEEE 1394 serial bus 3, which couples the host PC 1 and the optical disk drive 2 together. The host PC 1 issues a command or transmits or receives data to/from the optical disk drive 2. In this specification, the host PC 1 and the optical disk drive 2 will sometimes be called "initiator" and "target", respectively. The optical disk drive 2 includes: transceiver 4; reception buffer 5; transmission buffer 6; transmission-reception buffer 7; reception filter 8; transmission filter 9; packet processor 10; CPU 11; register 12; optical disk controller 13; analog signal processor 15; and optical head 17. The transceiver 4 includes a physical layer controller (PHY) 41 and a link layer controller (LINK) 42. The PHY 41 initializes the IEEE 1394 bus 3, encodes or decodes data, conducts arbitration and outputs or senses a bias voltage. The LINK 42 generates or detects cyclic redundancy codes (CRCs) or packets. The reception buffer 5 is implemented as an asynchronous reception FIFO buffer (ARF) for receiving a command, for example. The transmission buffer 6 is implemented as an asynchronous transmission FIFO buffer (ATF) for transmitting a status, for instance. The transmission-reception buffer 7 is implemented as a data transmission and reception FIFO buffer (DTRF). The reception filter (RFIL) 8 selectively stores a received packet on either the ARF 5 or DTRF 7 depending on the contents thereof. The transmission filter (TFIL) 9 selectively stores a packet to be transmitted on either the ATF 6 or DTRF 7 depending on the contents thereof. The packet processor (PPRC) 10 extracts only necessary data from a received packet and converts the extracted data into data to be transferred to the optical disk controller (ODC) 13 through a DMA bus 14. Alternatively, the PPRC 10 applies a header to the data that has been read out from an optical disk 16 by the head 17, processed by the analog signal processor 15 in a predetermined manner and then demodulated or error-correction coded by the ODC 13. Also, the PPRC 10 packetizes the data. The register 12 is connected to the CPU 11.

FIGS. 2A through 2E illustrate formats of some of asynchronous packets as defined by the IEEE 1394 standard. The IEEE 1394 standard defines a request packet requesting an operation to be performed and a response packet returning the result of the operation requested by the request packet. No matter whether the request packet or the response packet has been received at a recipient, the recipient always returns an acknowledge (ACK) packet, which represents the reception state of the packet, to its sender. The ACK packet may represent that processing is completed (ack_complete) or that the packet has been received certainly but is now being processed (ack_pending) or that the packet should be sent again (ack_busy). The request and response packets are ordinarily used in pairs. But depending on the contents of the ACK packet, processing may be completed just by receiving the ACK packet.

Figure 2D:
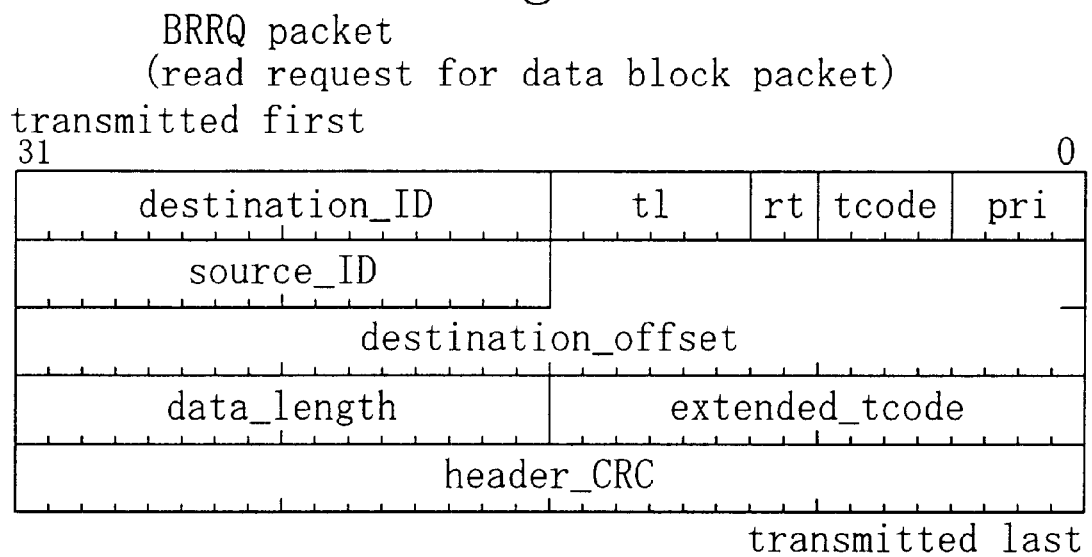
Figure 2E:
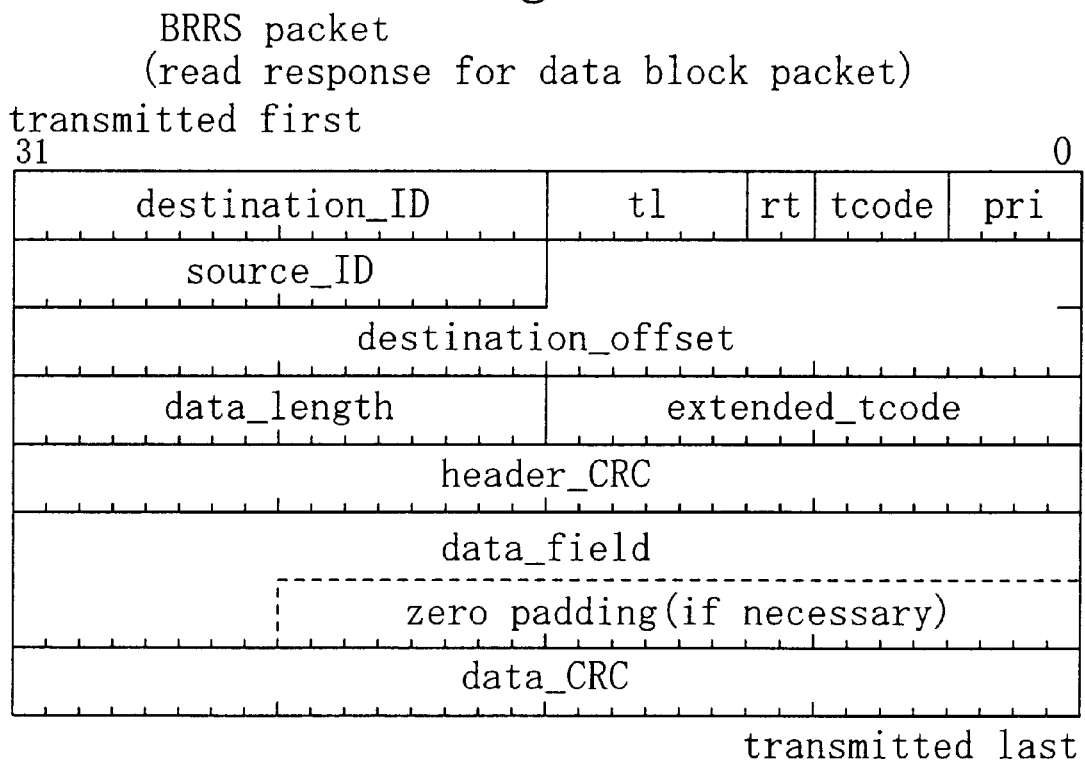
Figure 3A:
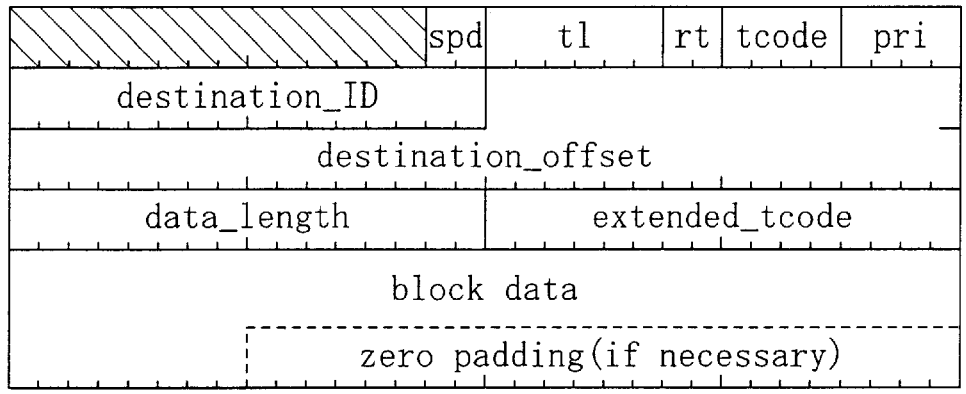
FIGS. 3A through 3E illustrate various formats of internal packets in the optical disk drive shown in FIG. 1.
Figure 3B:
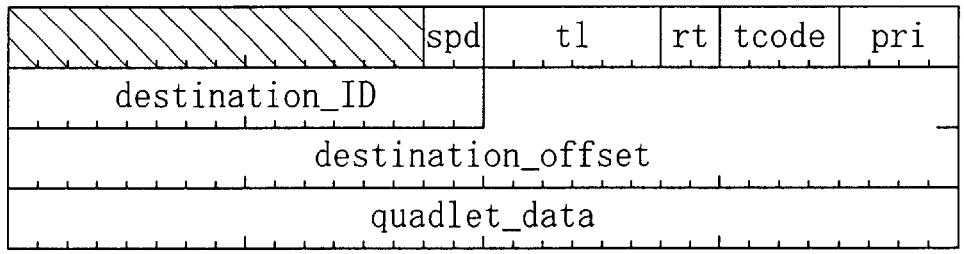
Figure 3C:
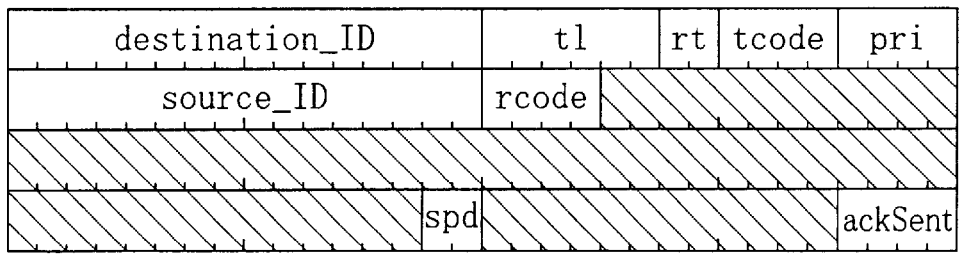
Figure 3D:
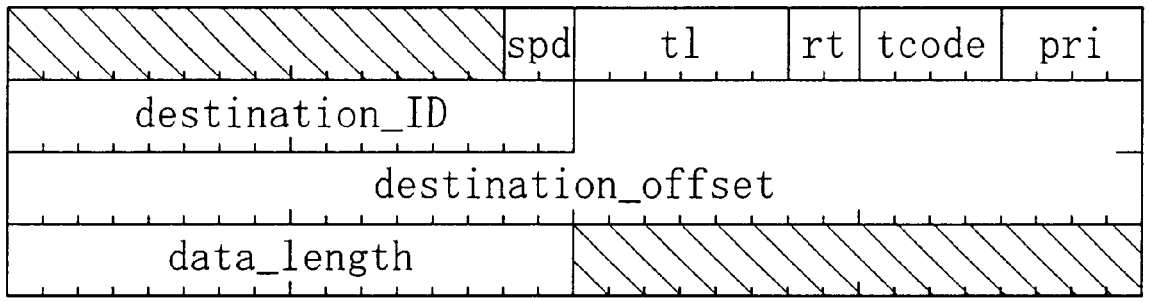
Figure 3E:
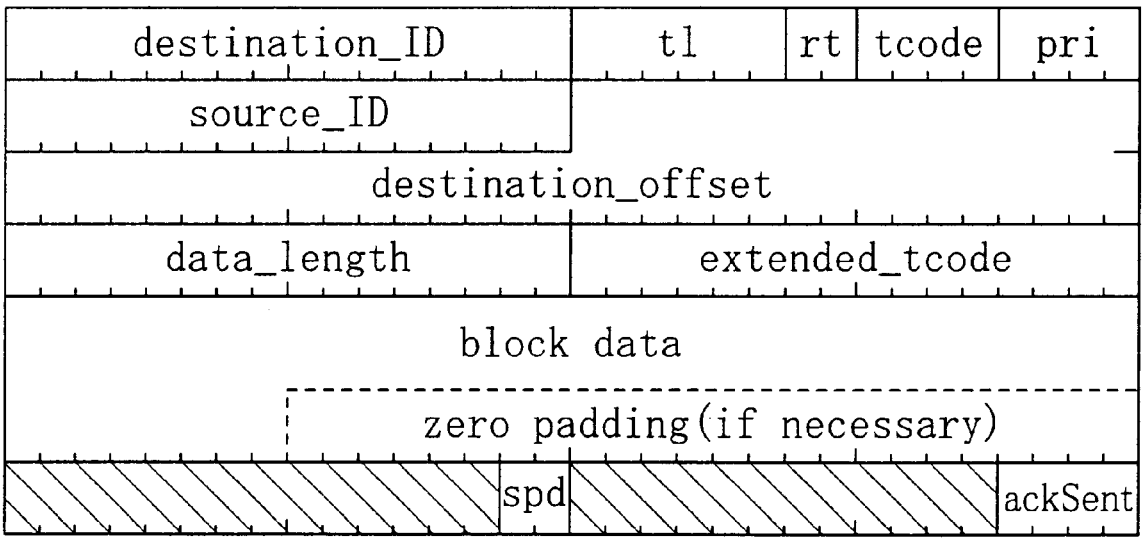

FIGS. 2A, 2B and 2D illustrate a write request for data block (BWRQ) packet, a write request for data quadlet (QWRQ) packet and a read request for data block (BRRQ) packet, respectively. A write response (WRS) packet shown in FIG. 2C is defined as a response packet responding to the write request (BWRQ or QWRQ) packet. A read response for data block (BRRS) packet shown in FIG. 2E is defined as a response packet responding to the BRRQ packet. In each of these packets, a transaction code tcode providing identification information of the type of the packet and a transaction label tl representing tag information unique to the transaction are contained. Also, in a response packet, a response code rcode representing the response state is contained. Accordingly, the type of the transaction is identifiable by tcode and a pair of request and response packets is recognizable by tl. For further details, see the IEEE Standard 1394-1995.

FIGS. 3A through 3E illustrate respective formats of internal packets in the optical disk drive 2 shown in FIG. 1 and correspond to FIGS. 2A through 2E, respectively. In FIGS. 3A through 3E, the hatched portions are reserved areas. Any of the internal packets to be transmitted is subjected to restructuring by the LINK 42 to compute header_CRC and/or data_CRC or to add source_ID. Any of the received internal packets represents a result of error detection and correction performed by the LINK 42.

First, suppose the target 2 should receive data from the initiator 1. If a BRRS packet, which includes, in its data field, data responding to a BRRQ packet requesting the transmission of the data from the initiator 1, has been received at the target 2, then the RFIL 8 stores the received BRRS packet on the DTRF 7. If a packet of any other type has been received, then the RFIL 8 stores the packet on the ARF 5. Next, suppose the target 2 should transmit data to the initiator 1. If the RFIL 8 has determined based on tcode, rcode and tl of a received packet that a WRS packet, which is paired with a BWRQ packet including, in its data field, data to be transmitted, has been received, then the RFIL 8 informs the PPRC 10 of the reception. If a packet of any other type has been received, then the RFIL 8 stores the received packet on the ARF 5. In transferring data, the TFIL 9 selectively determines based on tcode of a packet to be transmitted whether the packet should be stored on the ATF 6 or the DTRF 7.

FIG. 4 illustrates the operations to be performed when data is exchanged between the initiator 1 and the target 2 in accordance with the SBP-2 protocol. Hereinafter, the operations to be performed when the initiator 1 reads out data from the target 2, i.e., a situation where the initiator 1 has issued a READ command, will be described with reference to FIG. 4. It should be noted that before the data is transferred, various data items or commands are actually exchanged between the initiator 1 and the target 2. However, the description of these exchange operations will be omitted herein.

(1) To transfer the data, first, the initiator 1 issues a QWRQ packet to an AGENT_RESET register among Command Block Agent Registers that are defined. in Control and Status Registers (CSR) space at the target 2, thereby resetting a command block fetch agent.

(2) Suppose an ACK packet that has been sent back from the target 2 responsive to the QWRQ packet is ack_complete or an ACK packet in the ack_pending state has been once sent back and then a WRS packet, whose rcode represents the completion of processing resp_complete, is returned from the target 2. In such a case, the initiator 1 issues a BWRQ packet, which includes, in its data field, an address of an operation request block (ORB) that has been created in its system memory, to an ORB_POINTER register at the target 2 and then writes the packet on the register. The ORB includes a command from the initiator 1. In response, the target 2 issues a BRRQ packet to the system memory address of the initiator 1, at which the ORB is stored. On receiving the BRRQ packet, the initiator 1 sets the ORB in the data field of a BRRS packet, which is the response packet of the BRRQ packet, and sends the BRRS packet to the target 2. In this manner, the target 2 receives the ORB including a command from the initiator 1.

(3) In response, the target 2 analyzes the received ORB. Supposing the ORB represents a READ command, the target 2 prepares data to be transferred and then issues a BWRQ packet, which includes the data in its data field, to the system memory address of the initiator 1 that is specified by the ORB in which the READ command is included. Then, the data is stored at the specified memory address in the initiator 1. In this case, the size of the BWRQ packet depends on the transfer rate of the IEEE 1394 bus 3. Thus, if a large quantity of data needs to be transferred, then the data should be divided into plural data blocks and transferred in multiple BWRQ packets. In the illustrated embodiment, a data block is transferred while seeing if a transaction is completed. That is to say, the data block may be transferred while checking whether the target 2 has received an ACK packet representing the completion of processing (ack_complete) responsive to a BWRQ packet. Alternatively, the data block may be transferred while checking whether the target 2 has received an ACK packet, representing that the BWRQ packet has been received by the initiator 1 but is now being processed (ack_pending), and then the target 2 has received a WRS packet representing resp_complete paired with the BWRQ packet.

(4) Once the data of the length specified by the ORB has been all transferred, the target 2 writes a status, corresponding to the READ command, onto the address that has been specified in advance by the initiator 1 using the BWRQ packet.

A series of operations concerning the READ command is completed in this manner. However, if the initiator 1 cannot receive a BWRQ packet that has been sent out from the target 2, then a retry (or retransmission) can be performed by making the initiator 1 return an ACK packet representing a request for retransmission.

Similarly, in executing a WRITE command, the target 2 reads out data, which is stored in the system memory of the initiator 1, using BRRQ packets and then writes the data onto the optical disk 16.

Figure 5B:
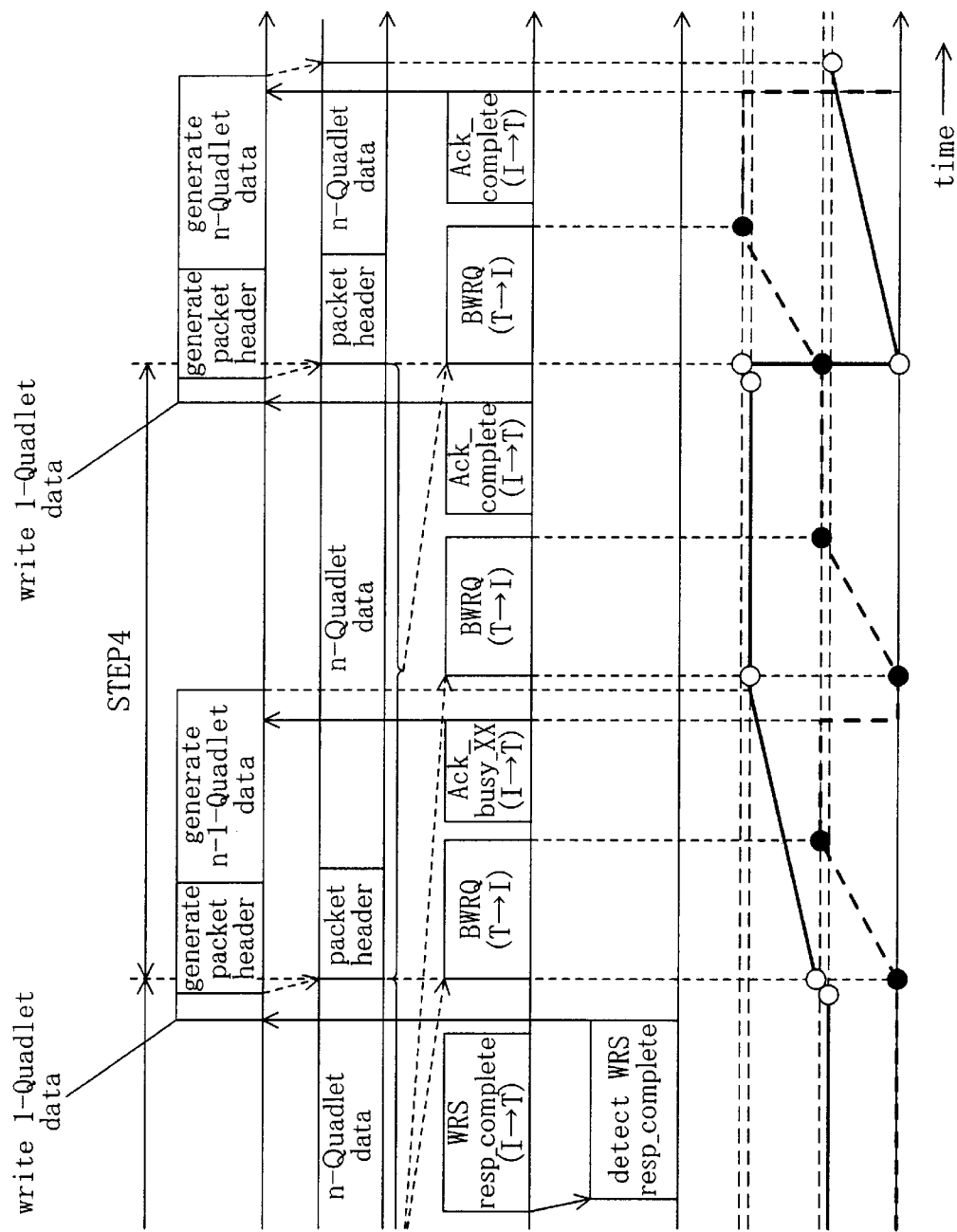

FIGS. 5A and 5B illustrate a situation where the initiator 1 writes data onto the target 2, i.e., where the initiator 1 has issued a READ command. In FIGS. 5A and 5B, open circles indicate write address pointers representing the locations where packets are written on the DTRF 7 by the PPRC 10, while solid circles indicate readout address pointers representing the locations where packets are read out from the DTRF 7 and then written on the LINK 42. In the illustrated embodiment, the capacity of the DTRF 7 is represented by 2×k quadlets and k represents the size of a maximum transferable packet. More specifically, in this embodiment, the transfer rate is supposed to be 400 Mbps (i.e., so-called "S400") and the size of transferable data that can be contained in one packet is supposed to be 2048 bytes (i.e., 512 quadlets). And the capacity of the DTRF 7 is supposed to be twice the sum of 512 quadlets, 4 quadlets in the header field and one endmost quadlet in the data field, i.e., (2048+16+4)×2=4136 bytes. That is to say, the buffer size of the DTRF 7 is supposed to be twice as large as the size of a packet used in transferring data, e.g., a BWRQ packet for a READ command and a BRRS packet for a WRITE command in accordance with the SBP-2 protocol. It should be noted that the maximum size of a data field in a packet is defined by the IEEE 1394 standard in accordance with the transfer rate.

In the example illustrated in FIGS. 5A and 5B, the initiator 1 is supposed to issue a READ command requesting 64 kB data. Since the size of data block in one BWRQ packet is 2 kB, 32 BWRQ packets should be transferred in response to the READ command.

(1) The initiator 1 creates an ORB, which includes a command descriptor block (CDB) specifying a READ command, within its own memory.

(2) The initiator 1 sends, in a BWRQ packet, the 1394 space address of the ORB in the memory to an ORB_PONITER register at the target 2.

(3) On receiving the BWRQ packet that has been sent out in (2), the target 2 issues a BRRQ packet to the address where the ORB is stored. In response, the initiator 1 returns a BRRS packet including the ORB to the target 2.

(4) The target 2 fetches the CDB from the BRRS packet received, confirms the READ command and then performs initialization to read out requested data from the optical disk 16. In this process step, the CPU 11 writes an address in the system memory at the initiator 1, which indicates the destination where the data should be stored as specified by the READ command, and header information items such as ID of the initiator 1 onto the PPRC 10 by way of the register 12.

Since data is now being transmitted by the target 2, the RFIL 8 is preset in the following manner. Specifically, if a WRS packet has been received, rcode included in the packet represents the completion of processing resp_complete and tl of the WRS packet received is equal to that of the BWRQ packet, then the RFIL 8 is supposed to send a detection signal to the PPRC 10. Otherwise, the RFIL 8 is supposed to store the received packet on the ARF 5.

Once the target 2 is activated, the specified data is read out from the optical disk 16, processed by the analog signal processor 15, subjected to demodulation and error correction coding at the ODC 13 and then input to the PPRC 10 following the header information items defined in the PPRC 10.

(5) The PPRC 10 makes an internal BWRQ packet which includes a data field of 2048 bytes and writes the packet onto the DTRF 7 via the TFIL 9 in STEP 1.

(6) After all the data that constitutes the internal BWRQ packet has been written on the DTRF 7, the data is passed to the LINK 42, where CRCs including header_CRC and data_CRC are added to the data to make a BWRQ packet. Then, arbitration is carried out by the PHY 41 to ensure the right to use the bus 3. Thereafter, the BWRQ packet created is sent out to the initiator 1. At the same time, the next internal BWRQ packet is made by the PPRC 10 and written onto the DTRF 7 concurrently. An address, which is obtained by adding 2048 to the address that has been written on the destination_field of the former BWRQ packet already transmitted, is written on the destination_field of the latter internal BWRQ packet. In the example illustrated in FIGS. 5A and 5B, before the last 1quadlet data in the internal BWRQ packet is written on the DTRF 7, an ACK packet representing the completion of processing ack_complete has already been detected at the LINK 42 for the BWRQ packet already transmitted. Thus, the last 1 quadlet data is written continuously in STEP 2.

(7) Once the last 1 quadlet data has been written on the DTRF 7, the internal BWRQ packet created is output to the LINK 42, where another BWRQ packet is made. And the BWRQ packet is output after the arbitration has been carried out by the PHY 41. At the same time, the next internal BWRQ packet is made by the PPRC 10 and written onto the DTRF 7 concurrently. An address, which is obtained by adding 2048 to the address that has been written on the destination_field of the BWRQ packet already transmitted, is written on the destination_field of the new internal BWRQ packet in a similar manner.

Suppose an ACK packet representing that the BWRQ packet already transmitted has been received but is now being processed (ack_pending) is detected at the LINK 42. In that case, the PPRC 10 does not write the last 1 quadlet data of the internal BWRQ packet onto the DTRF 7, but waits for a WRS packet to be transmitted from the initiator 1. After the WRS packet has been received and passed from the LINK 42 to the RFIL 8, tcode showing the identity as the WRS packet may be detected at the RFIL 8, rcode may represent the completion of processing resp_complete and tl may be equal to that of the BWRQ packet already transmitted. In such a case, a detection signal is sent to the PPRC 10 for restart purposes. In response to the detection signal, the PPRC 10 writes the last 1 quadlet data onto the DTRF 7 in STEP 3.

(7) Once the last 1 quadlet data has been written on the DTRF 7, the internal BWRQ packet created is output to the LINK 42, where another BWRQ packet is made. And the BWRQ packet is output after the arbitration has been carried out by the PHY 41. At the same time, the next internal BWRQ packet is made by the PPRC 10 and written onto the DTRF 7 concurrently. An address, which is obtained by adding 2048 to the address that has been written on the destination_field of the BWRQ packet already transmitted, is written on the destination_field of the new internal BWRQ packet in a similar manner.

Suppose an ACK packet requesting retransmission ack_busy is detected for the BWRQ packet already transmitted. In that case, the PPRC 10 does not write the last 1 quadlet data of the internal BWRQ packet onto the DTRF 7, but retransmits the data of the previous internal BWRQ packet stored on the DTRF 7 (i.e., the packet created in (7)). After the LINK 42 has detected that an ACK packet representing the completion of processing ack_complete has been transmitted from the initiator 1 in response to the BWRQ packet retransmitted, the PPRC 10 writes the last 1 quadlet data onto the DTRF 7 in STEP 4.

Thereafter, these operations will be repeatedly performed until the same number of data items as that specified by the READ command have been transferred. It should be noted that reading and writing from/onto the DTRF 7 are performed concurrently in STEPS 2, 3 and 4.

Figure 6A:
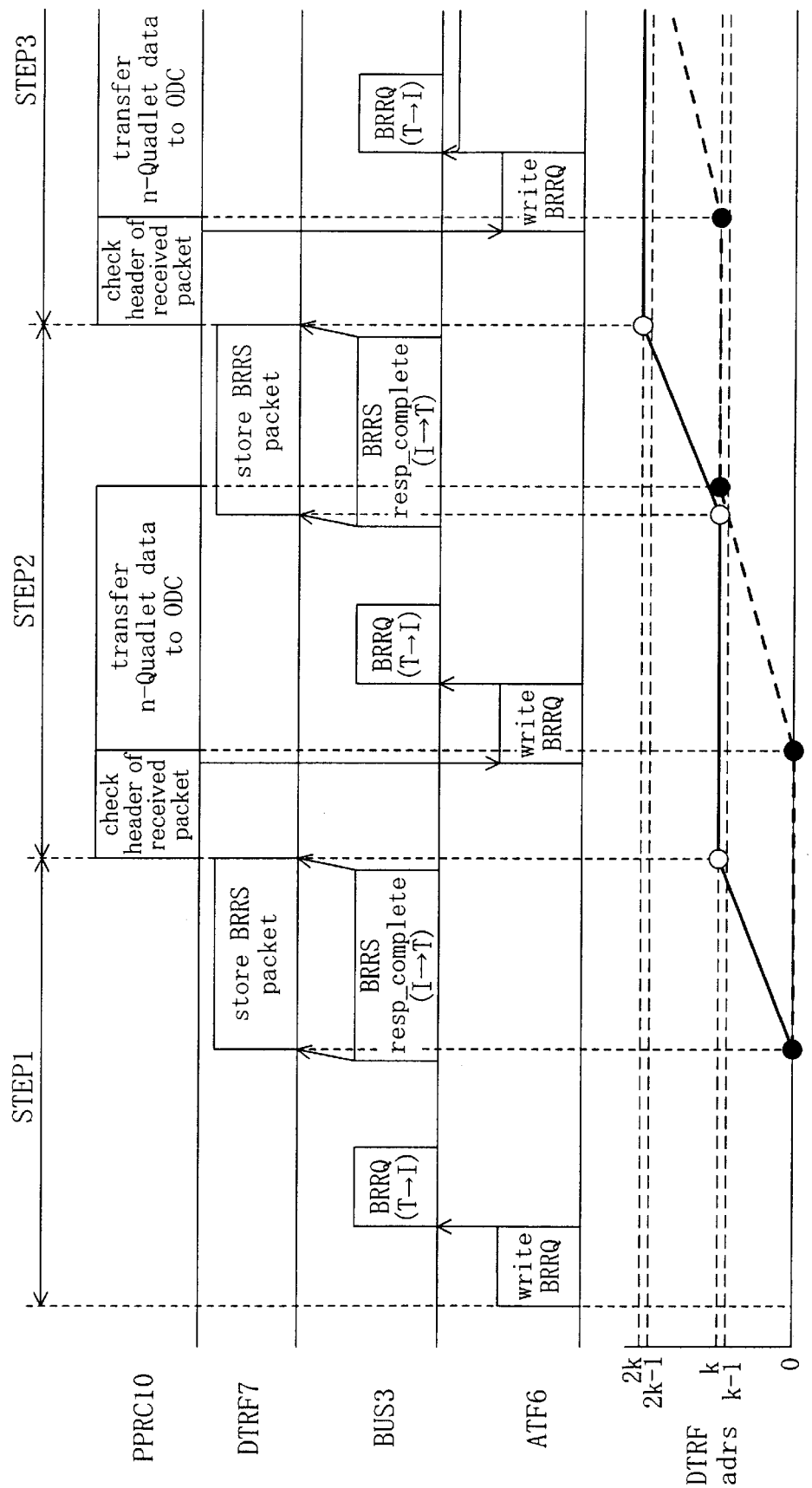
FIGS. 6A and 6B illustrate the operation performed by the communications system shown in FIG. 1 when a WRITE command is executed.
Figure 6B:
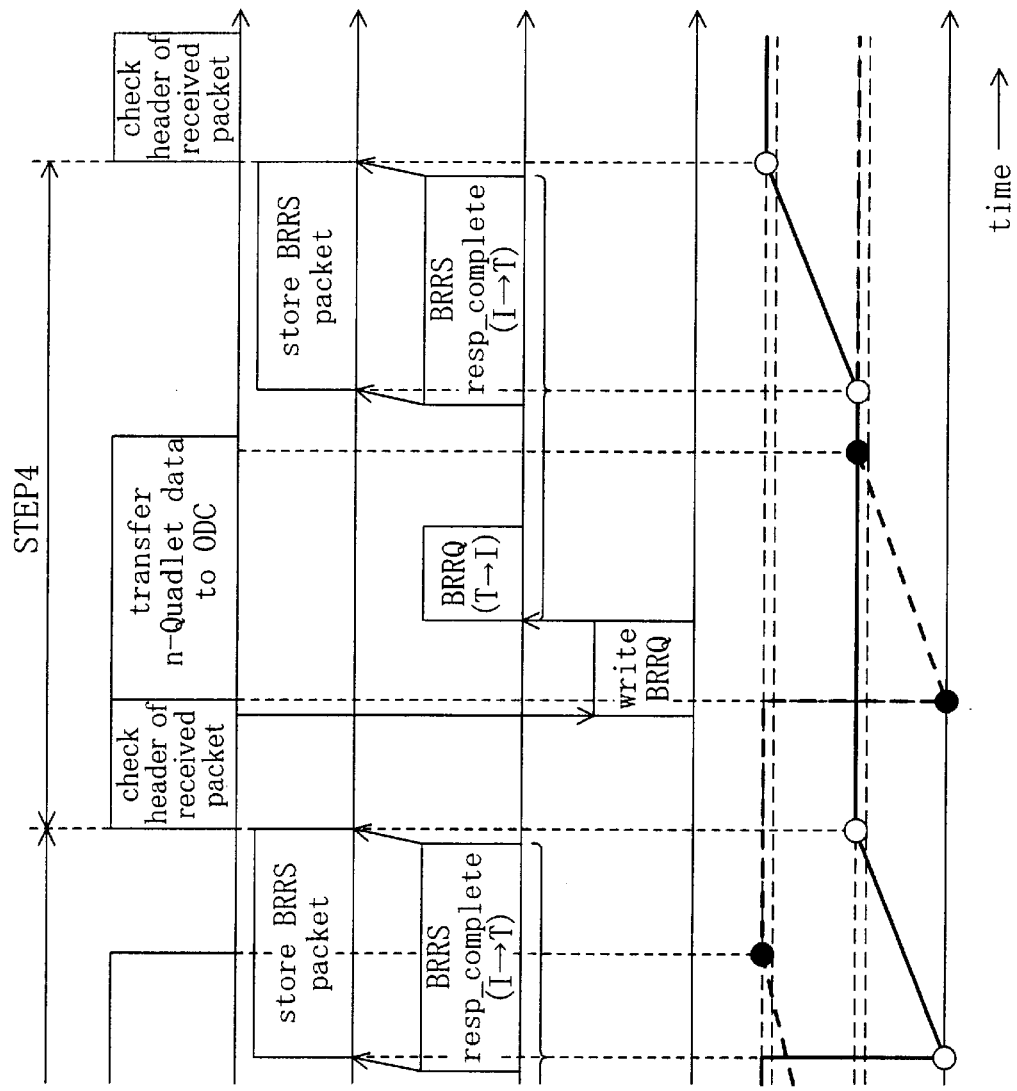

FIGS. 6A and 6B illustrate how the initiator 1 stores data on the target 2, i.e., a situation where the initiator 1 has issued a WRITE command. In FIGS. 6A and 6B, an open circle represents a write address pointer in a situation where a received packet is read out from the LINK 42 and written on the DTRF 7, while a solid circle represents a read address pointer in a situation where the PPRC 10 reads out the packet from the DTRF 7. In the illustrated embodiment, the initiator 1 is supposed to issue a WRITE command forwarding 64 kB data. Since the size of data block in one BRRS packet is 2 kB, 32 BRRS packets should be transferred for the WRITE command.

(1) The initiator 1 creates an ORB, which includes a CDB specifying a WRITE command, within its own memory.

(2) The initiator 1 sends, in a BWRQ packet, the 1394 space address of the ORB in the memory to an ORB_PONITER register at the target 2.

(3) On receiving the BWRQ packet that has been sent out in (2), the target 2 issues a BRRQ packet to the address where the ORB is stored. In response, the initiator 1 returns a BRRS packet including the ORB to the target 2.

(4) The target 2 fetches the CDB from the BRRS packet received, confirms the WRITE command and then performs initialization to write requested data onto the optical disk 16. In this process step, the CPU 11 writes an address in the system memory at the initiator 1, which indicates the location where the data that will be written on the optical disk 16 to execute the WRITE command is stored, and header information items such as ID of the initiator 1 onto the PPRC 10 by way of the register 12.

Since data is now being received by the target 2, the RFIL 8 is preset in the following manner. Specifically, if the reception of a BRRS packet, which is paired with the BRRQ packet, has been confirmed by tl and tcode and its rcode represents the completion of processing resp__complete, then the RFIL 8 is supposed to store the received packet on the DTRF 7. Otherwise, the RFIL 8 is supposed to store the received packet on the ARF 5.

Once the target 2 is activated, an internal BRRQ packet is created by the PPRC 10 to make a BRRQ packet for fetching the write data on the system memory of the initiator 1 using the header information items defined in the PPRC 10. Then, the internal BRRQ packet is written on the ATF 6 via the TFIL 9.

After this internal BRRQ packet has been written on the ATF 6, the packet is passed through the LINK 42 and the PHY 41. And at a point in time the right to use the bus 3 is obtained, the BRRQ packet is sent out to the initiator 1. In response, the initiator 1 sends back a BRRS packet, which includes the data requested by the BRRQ packet, to the target 2. In the target 2, tl, tcode and rcode of the received BRRS packet are checked by the RFIL 8. If the BRRS packet has been verified as a valid response packet to the BRRQ packet, then the BRRS packet is stored on the DTRF 7 in STEP 1.

(5) The header information items of the BRRS packet that has been received and stored on the DTRF 7 in (4), i.e., tcode and rcode, are checked by the PPRC 10. If tcode and rcode represent the identity as a BRRS packet and the completion of processing resp__complete, respectively, then the PPRC 10 writes an internal BRRQ packet requesting the next data transmission onto the ATF 6 via the TFIL 9. In this case, destination_offset is equal to a value obtained by adding 2048 to the destination_offset of the BRRQ packet previously transmitted. At the same time, the data items of the packet that has been received in (4) are sequentially read out by the PPRC 10. The ODC 13 adds an error correction code to the data and performs modulation processing thereon. And then the data processed is passed through the analog signal processor 15 and written on the optical disk 16. The internal BRRQ packet requesting the next data transmission, which has been written on the ATF 6, is passed through the LINK 42 and PHY 41 and then sent out to the initiator 1 as a BRRQ packet after the BRRQ packet has obtained the right to use the bus.

In response, the initiator 1 transmits a BRRS packet, which includes, in its data field, the data requested by the BRRQ packet, to the target 2. In the target 2, the received BRRS packet is stored on the DTRF 7 via the RFIL 8 in STEP 2.

Thereafter, these operations will be repeatedly performed in STEPS 3, 4 and so on until the same number of data items as that specified by the WRITE command have been transferred. It should be noted that reading and writing from/onto the DTRF 7 are performed concurrently in STEP 3. Also, in each of STEPS 2, 3 and 4, data that has been received responsive to a BRRQ packet is read out from the DTRF 7 and provided to the ODC 13, while at the same time, the next BRRQ packet is stored on the ATF 6.

As described above, by setting the buffer size of the DTRF 7 twice as large as that of a packet used for transferring data, overhead can be reduced and yet data can be transferred at high speeds.

Next, a situation where a task management command is issued from the initiator 1 while a READ command is being executed will be described. According to the SBP-2 standard, task management commands such as Login, QueryLogin and AbortTask are defined as described above. In this case, the initiator 1 accesses a Management Agent register defined by the SBP-2 standard, not the ORB_POINTER shown in FIG. 4 in response to the BWRQ packet. Thereafter, the target 2 reads out a Management ORB, which includes the task management command, by issuing a BRRQ packet. On receiving a BRRS packet as a response to the BRRQ packet, the target 2 analyzes the Management ORB included in the BRRS packet (in which the task management command is included) and executes the command. A task management command may sometimes have to be executed even while data is being transferred. For example, an AbortTask command that has been issued by the initiator 1 to abort a data transfer must be executed even during the transfer of data. This is because the target 2 would not operate as intended by the initiator 1 otherwise.

Figure 7A:
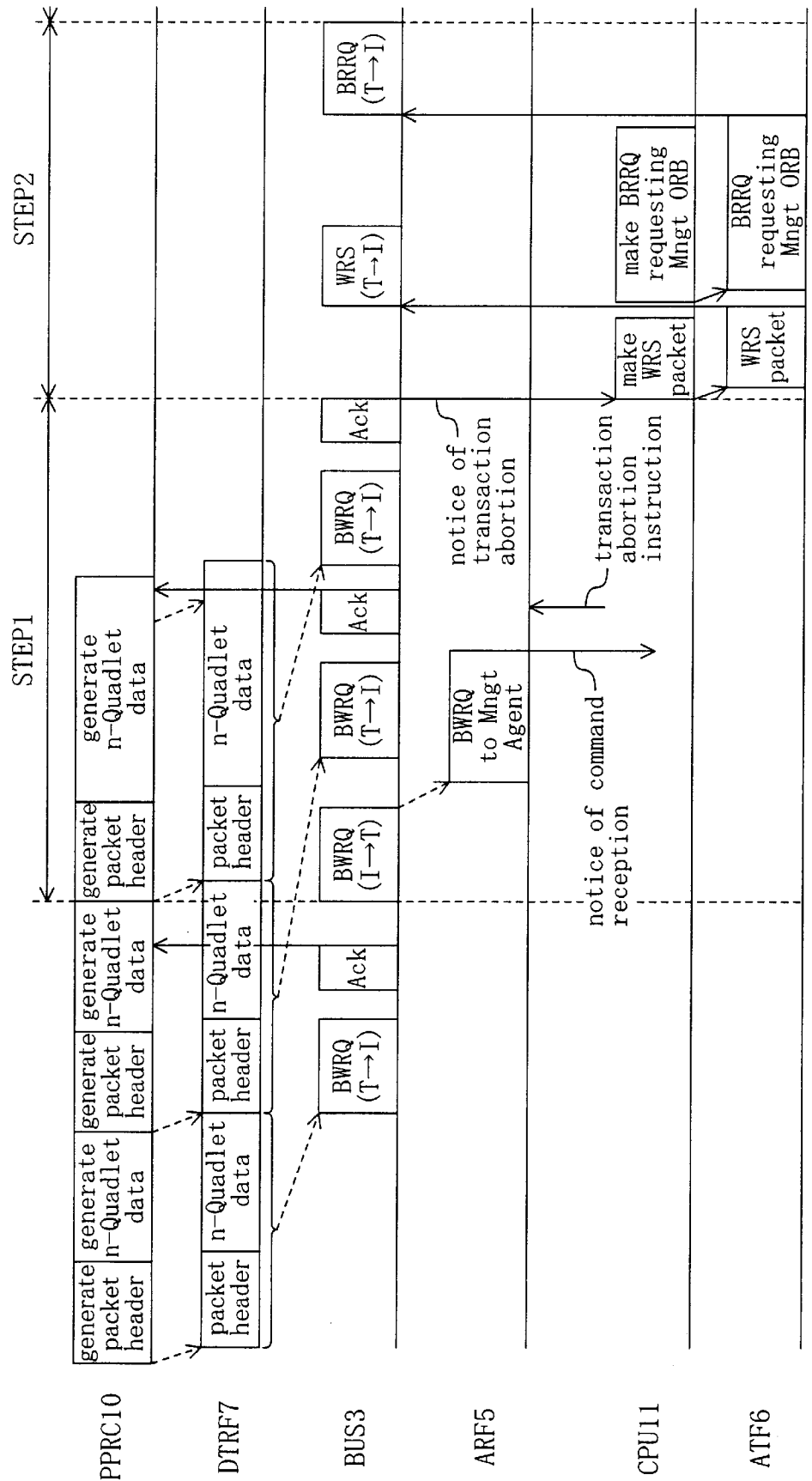
FIGS. 7A and 7B illustrate a situation where a task management command is issued while the READ command is being executed by the communications system shown in FIG. 1.
Figure 7B:
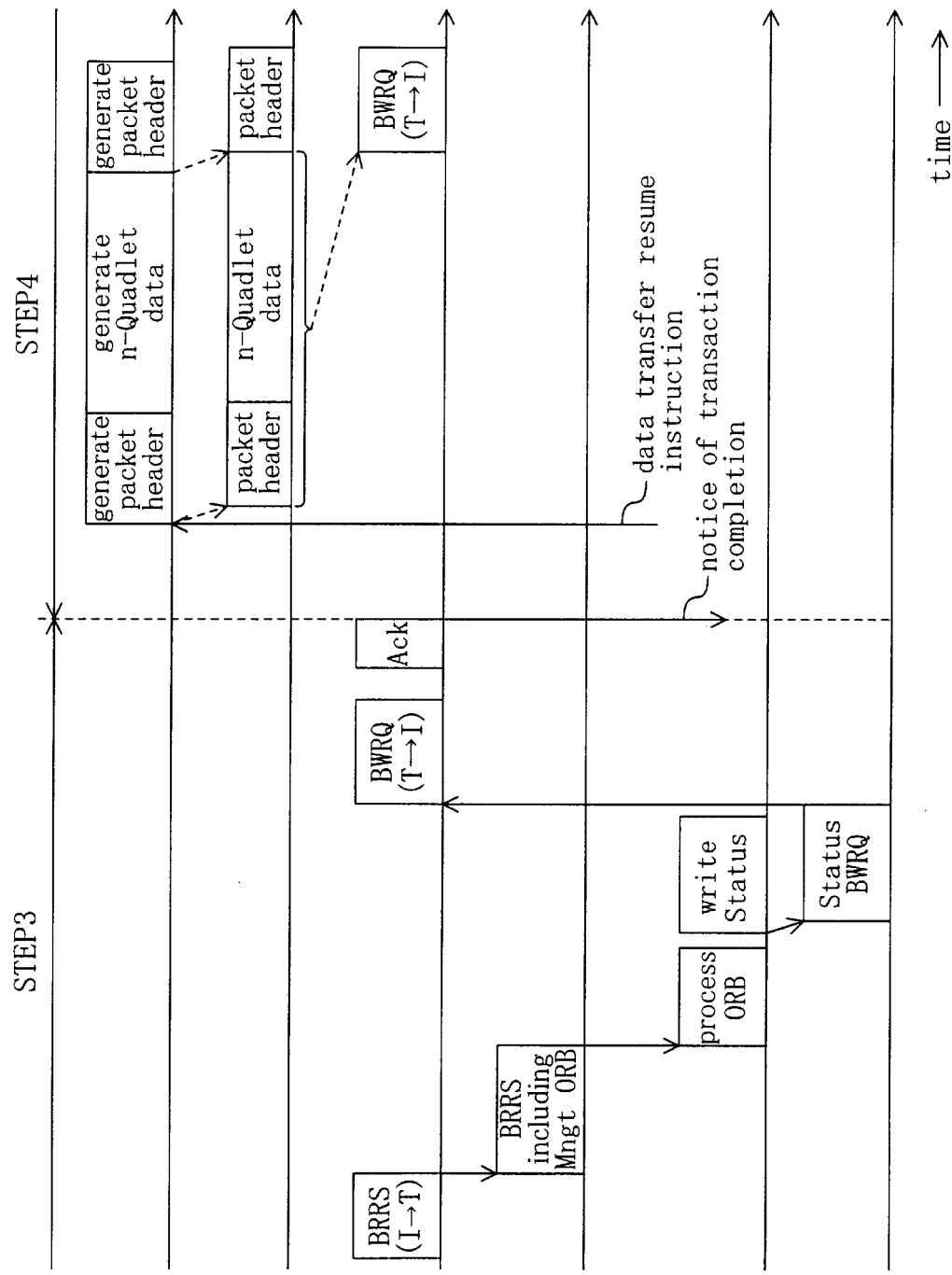

FIGS. 7A and 7B illustrate a situation where a task management command is issued from the initiator 1 while a READ command is being executed. In FIGS. 7A and 7B, BWRQ(T→I) represents that a BWRQ packet has been transmitted from the target (T) 2 to the initiator (I) 1. The same operations as those already described are performed until a packet containing data is actually transferred, and the description thereof will be omitted herein.

(1) Suppose a task management command (e.g., QueryLogin command) has been issued from the initiator 1 while data is being transferred (as represented by BWRQ(I→T) in STEP 1). In this case, the BWRQ(I→T) packet that has been issued from the initiator 1 to the Management Agent register is stored by the RFIL 8 on the ARF 5. This is because while a READ command is being executed (i.e., while data is being transmitted from the target 2), the RFIL 8 is supposed to store a received packet on the ARF 5 if one of the following conditions is satisfied: (a) when the received packet is not a WRS packet (the type of which is identifiable by tcode); (b) when the received packet is a WRS packet but tl included in the packet is not equal to tl of the BWRQ (T→I) packet transferring the data; and (c) when the received packet is a WRS packet and tl included in the packet is equal to tl of the BWRQ(T→I) packet transferring the data but rcode is not resp_complete representing the completion of processing. In response to the BWRQ(I→T) packet, the LINK 42 sends back an ACK packet ack_pending representing that the BWRQ (I→T) packet has been received but is now being processed (not shown).

When the BWRQ(I→T) packet received is stored on the ARF 5, an interrupt is generated in the CPU 11 and a transaction abortion instruction is issued by the CPU 11. In response to this instruction, the PPRC 10 continues reading out data from the ODC 13 until the data for the BWRQ (T→I) packet to be transmitted soon has been read out completely. After all the component data for the BWRQ (T→I) packet has been read out and written on the DTRF 7, the BWRQ(T→I) packet is passed through the LINK 42 and the PHY 41 and then sent out to the initiator 1 once the right to use the bus 3 has been obtained. Thereafter, when an ACK packet ack_complete representing that the BWRQ(T→I) packet has been processed completely is received, the CPU 11 is notified of the abortion of the transaction in STEP 1.

(2) When the CPU 11 is notified of the abortion of the transaction, the CPU 11 reads out the command that has been stored on the ARF 5 to recognize the BWRQ(I→T) packet to be addressed to the Management Agent register. And at the same time, the CPU 11 writes an internal WRS packet, which includes rcode representing the completion of processing resp_complete, on the ATF 6 via the TFIL 9. After the packet has been written, the packet is passed through the LINK 42 and the PHY 41 and then sent out as a WRS packet to the initiator 1. Subsequently, the CPU 11 writes an internal BRRQ packet requesting the Management ORB on the ATF 6 to the address specified in the BWRQ (I→T) packet where the Management ORB, in which the task management command is included, is stored. Thereafter, the packet is passed through the LINK 42 and the PHY 41 and then sent out as a BRRQ packet to the initiator 1 after the right to use the bus 3 has been obtained in STEP 2.

(3) In response to the BRRQ packet that has been transmitted in (2), a BRRS packet including the Management ORB is transmitted from the initiator 1 to the target 2. At the target 2, the BRRS packet received is passed through the LINK 42 and the RFIL 8 and then stored on the ARF 5. This is also because the RFIL 8 is preset to store received packets other than a WRS packet on the ARF 5. The CPU 11 reads out the ERRS packet, processes the Management ORB and then writes the status to the Management ORB on the ATF 6. As a result, a Status BWRQ packet including the status is transmitted to the initiator 1. When an ACK packet ack_complete representing the completion of processing is sent from the initiator 1 responsive to the Status BWRQ packet, the CPU 11 is notified of the completion of transaction in STEP 3.

(4) After having processed the Management ORB, the CPU 11 issues a data transfer resume instruction to the PPRC 10 to resume transferring data in STEP 4.

In the foregoing example, a task management command is supposed to be issued from the initiator 1 while a READ command is being executed. Similar processing may be performed even if a task management command is issued while a WRITE command is being executed. This is because the RFIL 8 is preset to store a received packet on the ARF 5 if one of the following conditions (a) through (c) is satisfied: (a) when the received packet is not a BRRS packet; (b) when the received packet is a BRRS packet but tl included in the packet is not equal to tl of the BRRQ packet requesting data; and (c) when the received packet is a BRRS packet and tl included in the packet is equal to tl of the BRRQ packet requesting data but rcode included in the received packet is not resp_complete representing the completion of processing.

As is apparent from the foregoing description, not only the ARF 5 and ATF 6 but also the DTRF 7 are provided according to the present invention and selectively used depending on the situation, thus reducing the overhead of firmware and transferring data at higher speeds. In addition, processing by the CPU 11 is required only when a command is issued while data is being transferred. Thus, the overhead of the firmware can be further reduced, data can be transferred at even higher speeds and yet task management commands can be easily coped with.

In the foregoing description, the entire processing flow of command reception is supposed to be under the control of the CPU 11. However, there is no problem and the same effects are attainable if the processing is performed only by the hardware until an ORB including a command is fetched. In the foregoing embodiment, while data is being transferred, command processing is supposed to be suspended until a packet to be transmitted has been transferred entirely. However, there is no problem if a command is processed and the data transfer is aborted as soon as the command is issued.

What is claimed is:
1. A data exchange unit that communicates with a counterpart unit through a transmission line using a packet including header and data fields, the exchange unit comprising:

a transmission buffer;

a reception buffer;

a transmission-reception buffer;

a transmission filter adapted to selectively store a packet on the transmission buffer or the transmission-reception buffer based on the contents of the packet to be transmitted;

a reception filter adapted to selectively store a received packet on the reception buffer or the transmission-reception buffer based on the contents of the received packet;

a packet processor adapted to at least one of instruct a packet containing information to be transmitted and retrieve necessary information from the received packet; and a transceiver adapted to at least one of convert the stored packet into an electrical signal, the electrical signal transmitted through the transmission line and to convert another electrical signal received through the transmission line into the stored packet.

2. The data exchange unit of claim 1, wherein the capacity of the transmission-reception buffer is twice as large as the size of a maximum transferable packet.

3. The data exchange unit of claim 1, wherein the transmission-reception buffer is a buffer on and from which data can be written and read out in parallel.

4. The data exchange unit of claim 1, wherein the transmission filter selectively stores the packet on the transmission buffer or the transmission-reception buffer based on a transaction code include in the header field of the packet.

5. The data exchange unit of claim 1, wherein the reception filter selectively stores the received packet on the reception buffer or the transmission-reception buffer based on a transaction code, a response code and a transaction label that are included in the header field of the received packet.

6. The data exchange unit of claim 1, wherein during data transmission, if the reception filter has determined based on a transaction code, a response code and a transaction label, which are all included in the header field of the received packet, that a response packet has been received in response to a request packet including transmitted data in the data field, then the reception filter informs the packet processor of the reception, and wherein if the reception filter has determined otherwise, then the reception filter stores the received packet on the reception buffer.

7. The data exchange unit of claim 6, wherein during data transmission, the packet processor stores the request packet on the transmission-reception buffer by way of the transmission filter.

8. The data exchange unit of claim 7, wherein during data transmission, after the packet processor has stored a request packet on the transmission-reception buffer and before an acknowledgment or a response to the request packet is received, the packet processor starts to store a next request packet on the transmission-reception buffer.

9. The data exchange unit of claim 8, wherein during data transmission, before the packet processor stores the last data item of a request packet on the transmission-reception buffer, the packet processor checks whether or not an acknowledgment or a response to a previous request packet has been received.

10. The data exchange unit of claim 1, wherein during data reception, if the reception filter has determined based on a transaction code, a response code and a transaction label, which are all included in the header field of the received packet, that a response packet has been received in response to a request packet requesting the transmission of data and including the requested data in the data field, then the reception filter stores the received packet on the transmission-reception buffer, and wherein if the reception filter has determined otherwise, then the reception filter stores the received packet on the reception buffer.

11. The data exchange unit of claim 10, wherein during data reception, the packet processor stores the request packet on the transmission buffer by way of the transmission filter.

12. The data exchange unit of claim 11, wherein during data reception, after the packet processor has received an acknowledgment or a response to a request packet, the packet processor stores a next request packet on the transmission buffer.

13. The data exchange unit of claim 12, wherein during data reception, the packet processor reads out data, which has been received responsive to a request packet, from the transmission-reception buffer, and stores a next request packet on the transmission buffer concurrently.

* * * * *

UNITED STATES PATENT AND TRADEMARK OFFICE
CERTIFICATE OF CORRECTION

PATENT NO. : 6,654,380 B1
DATED : November 25, 2003
INVENTOR(S) : Takashi Yumiba et al.

It is certified that error appears in the above-identified patent and that said Letters Patent is hereby corrected as shown below:

<u>Title page,</u>
Item [73], Assignee, delete "Kadoma (JP)" insert -- Osaka (JP) --;

Signed and Sealed this

Eighth Day of June, 2004

JON W. DUDAS
*Acting Director of the United States Patent and Trademark Office*